United States Patent [19]

Peake

[11] Patent Number: 4,563,232

[45] Date of Patent: Jan. 7, 1986

[54] PROCESS FOR THE PREPARATION OF REINFORCED THERMOPLASTIC COMPOSITES

[75] Inventor: Steven L. Peake, Ridgefield, Conn.

[73] Assignee: American Cyanamid Co., Stamford, Conn.

[21] Appl. No.: 664,182

[22] Filed: Oct. 24, 1984

Related U.S. Application Data

[63] Continuation-in-part of Ser. No. 575,095, Jan. 30, 1984, abandoned.

[51] Int. Cl.[4] ............................................. B32B 31/00
[52] U.S. Cl. .................................... 156/182; 106/311; 156/330.9; 252/364; 427/389.9; 428/261; 428/272; 428/473.5; 524/465; 524/466
[58] Field of Search ............. 252/364; 156/182, 330.9; 524/465, 466; 106/311; 427/389.9; 428/261, 272, 473.5

[56] References Cited

U.S. PATENT DOCUMENTS

| | | | |
|---|---|---|---|
| 3,376,150 | 4/1968 | Collins et al. | 106/311 |
| 3,654,227 | 4/1972 | Fine-Hart | 428/473.5 |
| 3,759,779 | 9/1973 | Fumas | 428/473.5 |
| 4,356,227 | 10/1982 | Stenzenberger | 427/389.9 |
| 4,428,992 | 1/1984 | Street | 428/473.5 |

Primary Examiner—John J. Gallagher
Attorney, Agent, or Firm—William H. Calnan

[57] ABSTRACT

Improved heat resistant reinforced composites, including laminates, are made by impregnating reinforcing fabrics and tapes, e.g., graphite, glass, polyaramide and boron, with thermoplastic polyimides from solution in mixtures of specified solvents formulated to retard rapid evaporation and to insure high resin loading, good fiber wetting and the absence of distortion.

20 Claims, No Drawings

PROCESS FOR THE PREPARATION OF REINFORCED THERMOPLASTIC COMPOSITES

CROSS REFERENCE TO RELATED APPLICATION

This application is a continuation-in-part of co-pending application Ser. No. 575,095, filed Jan. 30, 1984, now abandoned.

BACKGROUND OF THE INVENTION

This invention relates to a process to produce resin matrix materials. More particularly, it relates to an improved method to prepare resin-reinforced fiber composites, such as sheets and tapes, and their consolidation under heat and pressure into laminates.

Composites of resins and fibrous reinforcements are employed in airfoils such as spoilers, wings, flaps, ailerons, rudders, vertical stabilizers, horizontal stabilizers, helicopter blades, as well as other structural components requiring high stiffness and light weight. For example, the fibrous reinforcement can comprise glass fibers, graphite fibers and high temperature resistant fibers, such as polyaramid fibers and these can be unidirectional, as in tapes, random as in mats and felts, or woven, knitted, and the like. State of the art airfoils generally are made of graphite fiber resin composites in a plurality of plies, e.g., 5, consolidated under heat and pressure into a laminate in the shape of the airfoil being designed.

The resins which can be employed in the manufacture of such composites are generally curable thermosetting resins and/or thermoplastic resins which are high temperature resistant. Curable epoxy resins can be used by applying them to the fibers by any suitable method such as spraying or impregnation, for example, during winding. Solvents for the resins are often employed depending on the properties of the resin to insure thorough wetting of the fibers with the resin. Such resins are partially cured or B-staged to solidify the resin and to provide a fiber-reinforced composite ply which is self-supporting, a so-called pre-preg. Prepregs in the form of tapes, sheets and the like are then employed to prepare laminates, such as airfoils, by forming into an assembly and molding under heat and pressure by common techniques. See, for example, Jensen, U.S. Pat. No. 3,768,760.

Exemplary resins which can be employed include epoxy novolacs, polyimides, and other epoxies of two well known types, e.g., the bis-phenol epichlorohydrin and the bis(epoxy-cyclopentyl)ether types. Solvents which can be employed with such resins to aid in wetting the fibers, especially graphite fibers, are methyl ethyl ketone, acetone, ethanol, and mixtures thereof.

A more recent development is to use as the resin components particular families of polyimides, such as the polyimides derived from benzophenone tetracarboxylic anhydride and diaminoarenes, see, e.g., Alberino, et al., U.S. Pat. No. 3,930,097, and especially the thermoplastic polyetherimides derived from an aromatic bis-(ether anhydride) and an organic diamine, e.g., those of Takekoshi, et al., U.S. Pat. No. 3,917,643. These are difficult to dissolve in common solvents and, accordingly, they are usually applied to the fiber by either melt impregnation, which is difficult from a manufacturing standpoint and leads to poor fiber wetting, or by solvent impregnation from methylene chloride which gives poor fiber wetting, low resin uptake, and leads to distortion of the prepreg due to rapid solvent evaporation. In White, U.S. Pat. No. 4,049,613 are disclosed carbon fiber - polyetherimide matrix composites, in which the polyetherimide has terminal nitro groups. The resin is deposited on the carbon fiber from "a suitable organic solution in chloroform". Apart from the fact that an unconventional nitro-terminated polyimide must be used, the well-known adverse physiological effects of chloroform, especially 100% chloroform, must be considered disadvantageous.

It has now been discovered that, if a judicious selection of solvents is made, in formulating a multicomponent solvent mixture, that thermoplastic polyimides can be formed into prepregs by deposition from solutions using entirely conventional manufacturing equipment. The need to use expensive dipolar aprotic solvents, such as dimethyl formamide, dimethyl acetamide, dimethyl sulfoxide, dimethyl sulfone, hexamethylphosphoramide, N-methyl-2-pyrrolidone, tetramethylurea, pyridine, and the like, as taught by above-mentioned U.S. Pat. No. 3,930,097, or toxic and caustic phenol, as taught by above mentioned U.S. Pat. No. 3,917,643, and toxic 100% chloroform as taught by U.S. Pat. No. 4,049,613, is avoided. A very high quality prepreg is obtained, with high resin uptake and no distortion.

SUMMARY OF THE INVENTION

According to the present invention, there is provided a process for the preparation of a polyimide resin-fibrous reinforced composite comprising the steps of (i) impregnating a fibrous reinforcement with a solution in an organic solvent of a thermoplastic polyimide, and (ii) removing the organic solvent from said impregnated reinforcement, said organic solvent comprising in admixture a first solvent component (a) selected from the group consisting of chloromethane, dichloromethane, trichloromethane, dichloroethane, trichloroethane and methoxybenzene; and a second co-solvent component (b), different from, but compatible with and of lower volatility than said first solvent component (a), selected from the group consisting of dichloromethane, trichloromethane, dichloroethane, trichloroethane, methoxybenzene, tetrachloromethane, trichloroethylene, chlorobenzene and butyrolactone, the amount of (b) in said solvent being at least sufficient to reduce the evaporation rate of the admixture but not in excess of an amount which causes separation of said polyimide therefrom.

Also contemplated as a preferred feature of the invention is a process as above defined which also includes (iii) providing a plurality of layers of said impregnated reinforcement, alone, or in combination with layers of one or more other impregnated reinforcements and (iv) consolidating the plurality of layers under heat and pressure into a laminate.

In another aspect of this invention, there is provided a process for the preparation of a polyimide resin-fibrous reinforced composite comprising the steps of (i) impregnating a fibrous reinforcement with a solution in an organic solvent of a thermoplastic polyimide, and (ii) removing the organic solvent from said impregnated reinforcement, said organic solvent comprising in admixture a polychlorinated alkane (a) of the formula Especially preferably the thermoplastic polyetherimide will be of the formula

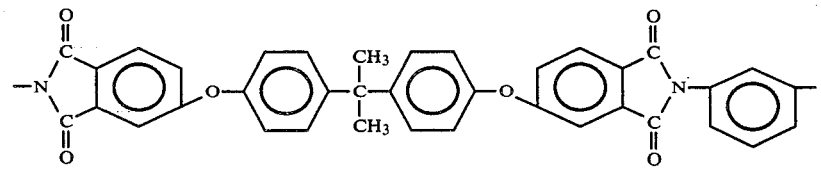

Such a material is available commercially from General Electric Company under the trademark ULTEM ® resin.

The formula shown is that of ULTEM ® 1000; variants thereof, also suitable in the broad practice of the present invention, are commercially available as ULTEM ® D5000 resin and ULTEM ® 6000 resin. Further suitable polyether imides include modifications of the above (ULTEM ® 1000)resin wherein the polymer backbone contains from 1 to 25% by weight, based on the weight of the polymer, of repeating units derived from one or more of diamines, dianhydrides and combinations thereof, selected from the group consisting of diamines of the formula:

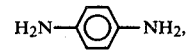

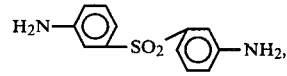

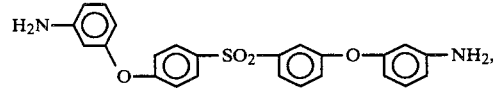

wherein R=H— or CH₃CH₂—,

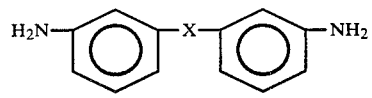

wherein X=—CH₂—, —O—, —SO₂, or —S—, and

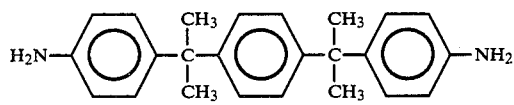

and the group consisting of dianhydrides of the formula:

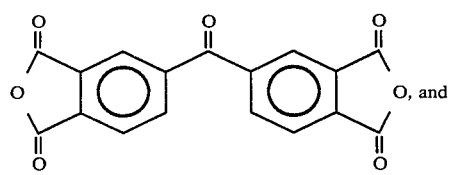

wherein X is H or —CH₂Cl, and Y is H or Cl, or a mixture of such compounds and (b) either a chlorinated alkene of the formula

or a chlorinated aromatic compound of the formula

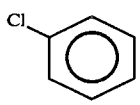

the amount of (b) in said solvent being at least sufficient to reduce the evaporation rate of the admixture but not in excess of an amount which causes separation of said polyimide therefrom.

Also contemplated as a preferred feature of this aspect the invention is a process as above defined which also includes (iii) providing a plurality of layers of said impregnated reinforcement, alone, or in combination with layers of one or more other impregnated reinforcements and (iv) consolidating the plurality of layers under heat and pressure into a laminate.

DETAILED DESCRIPTION OF THE INVENTION

The thermoplastic polyimide can vary widely in chemical type and can include, for example, the reaction products of benzophenone tetracarboxylic dianhydride and a diaminoarene compound as disclosed in above-mentioned U.S. Pat. No. 3,930,097. Preferably there will be used a polyether imide of the type described in above-mentioned U.S. Pat. No. 3,917,643. These have the general formula

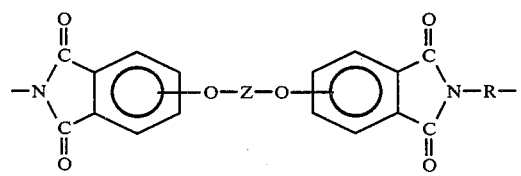

wherein Z is a divalent arylene and R is a divalent hydrocarbon radical.

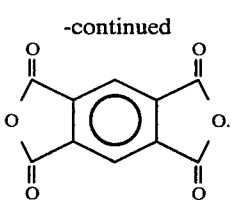

Illustrative solvents of type (a) include dichloromethane, trichloromethane, methoxybenzene, methylene chloride, 1,1,2-trichloroethane, 1,2-dichloroethane. For type (b) there may be used any co-solvent component compatible with and of lower volatility than solvent (a), selected from the group consisting of dichloromethane, trichloromethane, dichloroethane, trichloroethane, methoxybenzene, tetrachloromethane, trichloroethylene, chlorobenzene and butyrolacetone.

Particularly suitable for polyimide resins of the ULTEM ® 1000 and D5000 type are mixtures of trichloromethane and dichloromethane containing up to about 50% by weight of dichloromethane, based on the weight of the solvent mixture. Also especially suitable for the ULTEM ® 1000 type resins are 50:50 (by weight) mixtures of dichloromethane and dichloroethane.

The ratios of solvent type (a) to type (b) in the admixture can vary, but will fall within the following functional parameters. The polyimides are readily soluble in type (a), but these are highly volatile relative to type (b) utilized therewith. If not enough (b) is present, type (a) will evaporate too fast and cause distortion in the prepreg, and a low resin loading. If too much type (b) is present, the polyimide may be forced out of solution as a separate phase. With the above in mind, the amount of (b) will be at least sufficient to reduce the evaporation rate of the admixture but not in excess of an amount which causes separation of the polyimide therefrom. These parameters can be readily determined for any system by simple trials well within the skill of the worker in this art. In most cases, numerically, the amount of (b) will fall within the range of 5 to 85 parts by weight, more preferably 10 to 50 parts by weight, per 100 parts by weight of (a) and (b) combined.

Conventional methods are used to carry out the processes of the present invention.

Illustratively the reinforcing materials employed in the composites of the invention are fibrous graphite, aromatic polyamides, polyimides or polyamideimides and the like. The fibrous reinforcing materials can be in the form of filaments, yarn, roving, chopped roving, knitted or woven fabrics, tapes and the like. The reinforcing material is used in an amount ranging from about 15 to about 80 parts by weight per 100 parts by weight of the composite.

The composites are generally prepared by contacting the reinforcing material with, or incorporating it into, the solution of polyimide in the admixed solvent, thereafter removing the solvent from the mixture. Finally, a plurality of layers of such composite, alone or with other composites, is subjected to fusion under pressure to produce a consolidate. In a particularly preferred embodiment there is produced a laminate. Any of the methods employed in the art for the preparation of laminates from thermoplastics and/or thermosettable composites can be used. See for example, Encyclopedia of Polymer Science and Technology, Vol. 2, p. 300, Vol. 8, p. 121, John Wiley and Sons, New York 1965 and 1968.

In one convenient embodiment, layers of woven or unidirectional fibrous reinforcing material are impregnated with a solution of a polyetherimide in a mixture of methylene chloride and 1,1,2-trichloroethylene. The solution can contain preferably from about 10 to about 40 parts by weight of polyetherimide per 100 parts by weight of resin and solvent and the solution is applied to the reinforcing material in such amount as to deposit on the latter an amount of polyimide which corresponds to about 20 to about 50 parts by volume in combination with about 50 to about 80 parts by volume of reinforcing material.

The impregnation of the fibrous reinforcing material with the polyimide can be accomplished by any of the methods conventional in the art for such a process, i.e., by dipping, spraying, brushing, and other such methods.

After the impregnation has been completed, the organic solvent is removed from the impregnated material by evaporation of about 3–10% of the solvent at 25° to 60° C. Any remainder can be removed at a higher temperature and under reduced pressure.

To make a laminate or a shaped article, such as an airfoil, layers of the resin-fibrous reinforcing material ("prepreg") which are thus obtained are assembled alone, or with other prepregs, such as polyimides with different reinforcement or reinforcements with other resins, such as epoxies and the like, into overlapping relationship in a suitable mold of any desired configuration, and are subjected to heat and pressure to produce the desired laminate. The pressures generally employed range from about 100 psi to about 3,000 psi and the temperatures are at least as high as the glass transition temperature of the polyimide, i.e., of the order of about 310° C. and preferably within the range of about 340° C. to about 360° C.

Other known means to produce laminates can also be used such as low pressure vacuum bagging or moderated pressure autoclave vacuum bagging, as detailed in the articles cited above.

DESCRIPTION OF THE PREFERRED EMBODIMENTS

The following examples illustrate the present invention, but the claims are not to be construed as limited thereto.

EXAMPLE 1

A continuous tape of woven graphite fiber was immersed in a bath of the polymeric reaction product of 2,2-bis[4-(3,4-dicarboxyphenoxy)phenyl] propane and m-phenylenediamine (General Electric Company, ULTEM ® 1000 resin). The solution comprised 20 parts by weight of polyether imide resin, 40 parts by weight of methylene chloride and 40 parts by weight of 1,2-dichloroethane. Solvent was removed by air drying and there was produced a prepreg containing 37 parts by weight of resin and 63 parts by weight of reinforcement. This was a high loading of resin and the prepreg was not distorted by rapid solvent evaporation.

Eight layers of the prepreg were placed in a heated press and held 10 minutes at 300° C. then cooled to 100° C. under 350 psi pressure. The resulting laminate had an interlaminar shear strength of 11.0 KSI.

EXAMPLE 2

The general procedure of Example 1 is repeated, substituting a woven glass reinforcement for the graphite. A polyimide-glass reinforced high quality prepreg is obtained, which can be consolidated under heat and pressure into a laminate.

EXAMPLE 3

The general procedure of Example 1 is repeated, substituting polyaramid filaments (DuPont KEVLAR ®) for the graphite. A polyimide high temperature resistant organic fibrous reinforced high quality prepreg is obtained, which can be consolidated under heat and pressure into a laminate.

EXAMPLE 4

A resin solution for making prepregs is made by first dissolving ULTEM ® 1000 in dichloromethane at the 25% solids level. This solution is then diluted to 15% solids using 1,1,2-trichloroethylene. If the procedure of Example 1 is then repeated with graphite fiber tape, a high quality prepreg tape will be obtained.

EXAMPLE 5

If the general procedure of Example 4 is repeated, substituting chlorobenzene for 1,1,2-trichloroethylene, a high quality prepreg will be obtained.

EXAMPLE 6

If the general procedure of Example 4 is repeated, substituting carbon tetrachloride for 1,1,2-trichloroethylene, a high quality prepreg will be obtained.

EXAMPLE 7

If the general procedure of Example 1 is repeated, substituting, 1,1,2-trichloroethane for methylene chloride, a high quality prepreg tape will be obtained.

EXAMPLE 8

If the general procedure of Example 4 is repeated substituting butyrolactone for 1,1,2-trichloroethylene, a high quality prepreg tape will be obtained.

EXAMPLE 9

If the general procedure of Example 1 is repeated, substituting anisole (methoxybenzene) for 1,2-dichloroethane, a high quality prepreg tape will be obtained.

EXAMPLE 10

If the general procedure of Example 1 is repeated, substituting for the ULTEM ® 1000 polyimide, General Electric Company's ULTEM ® D 5000 polyimide resin, and a 50—50 weight/weight mixture of trichloromethane—dichloromethane as solvent, a high quality prepreg tape will be obtained.

EXAMPLE 11

If the general procedure of Example 10 is repeated, substituting 1,1,2-trichloroethane for the trichloromethane in the 50—50 solvent mixture, a high quality prepreg tape will be obtained.

The above-mentioned patents, applications and publications are incorporated herein by reference. The foregoing detailed descriptions will suggest many variations to those skilled in this art. All such obvious variations are within the full intended scope of the appended claims.

What is claimed is:

1. A process for the preparation of a polyimide resin-fibrous reinforced composite comprising the steps of
   (i) impregnating a fibrous reinforcement with a solution in an organic solvent of a thermoplastic polyimide, and
   (ii) removing the organic solvent from said impregnated reinforcement, said organic solvent comprising in admixture a polychlorinated alkane (a) of the formula

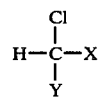

wherein X is H or —CH$_2$Cl, and Y is H or Cl, or a mixture of such compounds and (b) either a chlorinated alkene of the formulae

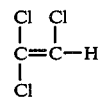

or a chlorinated aromatic compound of the formula

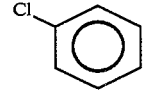

the amount of (b) in said solvent being at least sufficient to reduce the evaporation rate of the admixture but not in excess of an amount which causes separation of said polyimide therefrom.

2. A process as defined in claim 1 which also includes
   (iii) providing a plurality of layers of said impregnated reinforcement, alone, or in combination with layers of one or more other impregnated reinforcements and
   (iv) consolidating the plurality of layers under heat and pressure into a laminate.

3. A process as defined in claim 1 wherein said polyimide is a polyetherimide of the formula

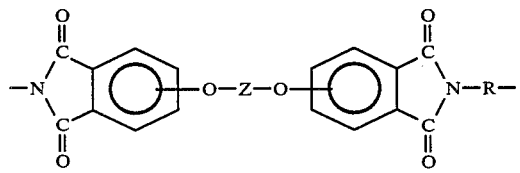

wherein Z is divalent arylene and R is a divalent hydrocarbon radical.

4. A process as defined in claim 3 wherein said polyetherimide is of the formula

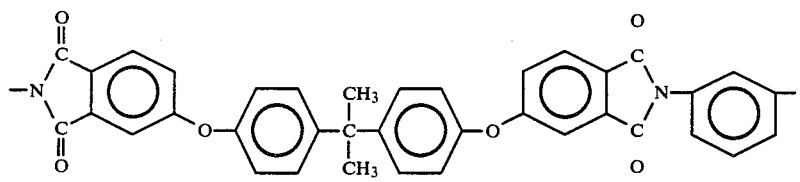

5. A process as defined in claim 1 wherein the reinforcement is a glass tape or fabric.

6. A process as defined in claim 1 wherein the reinforcement is a graphite tape or fabric.

7. A process as defined in claim 1 wherein the reinforcement is a high temperature resistant organic tape or fabric.

8. A process for the preparation of a polyimide resin-fibrous reinforced composite comprising the steps of
(i) impregnating a graphite fibrous reinforcement with a solution in an organic solvent of a thermoplastic polyetherimide comprising repeating units of the formula

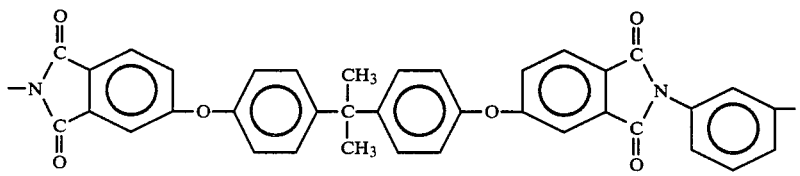

(ii) removing the organic solvent from said impregnated reinforcement, said organic solvent comprising in admixture at least one polychlorinated alkane (a) of the formulae,

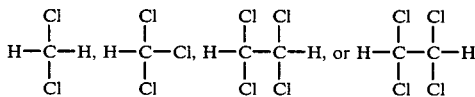

and
(b) either a chlorinated alkene of the formula

or a chlorinated aromatic compound of the formula

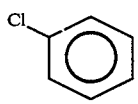

the amount of (b) in the admixture of (b) and (a) ranging from 5 parts to 85 parts by weight per 100 parts by weight of (a) and (b) combined.

9. A process as defined in claim 8 which also includes
(iii) providing a plurality of layers of said impregnated reinforcement, alone, or in combination with layers of one or more other impregnated reinforcements, and
(iv) consolidating the plurality of layers under heat and pressure into a laminate.

10. A process as defined in claim 8 wherein the polymer backbone of the thermoplastic polyetherimide described in (i) contains from 1 to 25% by weight, based on the weight of the polymer, of repeating units derived from one or more of diamines, dianhydrides and combinations thereof, selected from the group consisting of diamines of the formula:

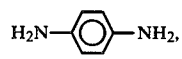

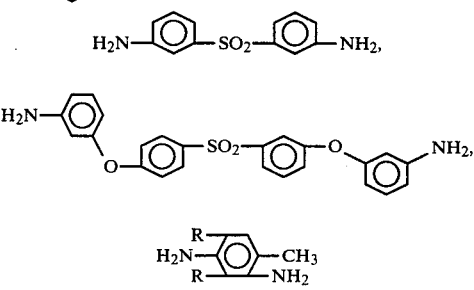

wherein R=H— or CH$_3$CH$_2$—,

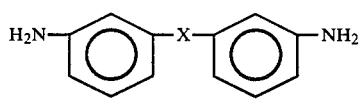

wherein X=—CH$_2$—, —O—, —SO$_2$, or —S—, and

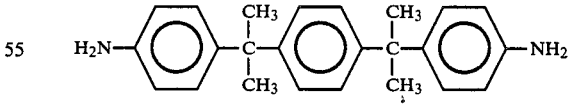

and the group consisting of dianhydrides of the formula:

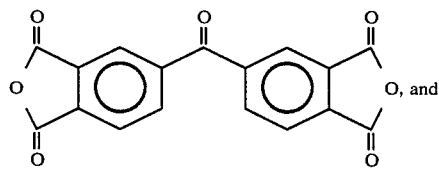

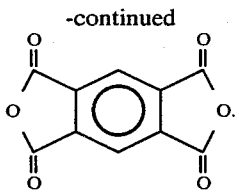

11. A process for the preparation of a polyimide resin-fibrous reinforced composite comprising the steps of
(i) impregnating a fibrous reinforcement with a solution in an organic solvent of a thermoplastic poly-

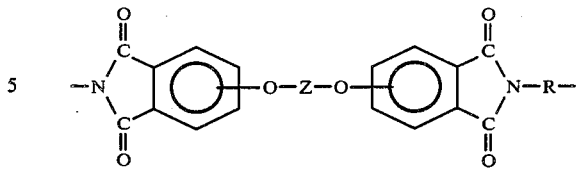

wherein Z is divalent arylene and R is a divalent hydrocarbon radical.

14. A process as defined in claim 13 wherein said polyetherimide is of the formula

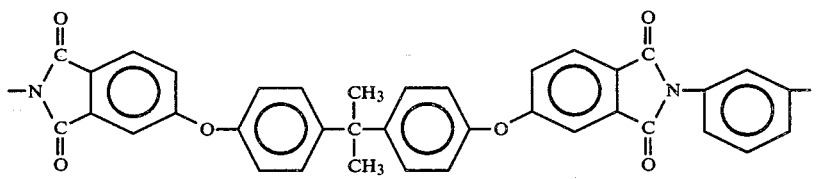

imide, and
(ii) removing the organic solvent from said impregnated reinforcement, said organic solvent comprising in admixture a first solvent component (a) selected from the group consisting of chloromethane, dichloromethane, trichloromethane, dichloroethane, trichloroethane, methoxybenzene and mixtures of any of the foregoing; and a second co-solvent component (b), different from, but compatible with and of lower volatility than said first solvent component (a), and selected from the group consisting of dichloromethane, trichloromethane, dichloroethane, trichloroethane, methoxybenzene, tetrachloromethane, trichloroethylene, chlorobenzene, butyrolactone, and mixtures of any of the foregoing the amount of (b) in said solvent being at least sufficient to reduce the evaporation rate of the admixture but not in excess of an amount which causes separation of said polyimide therefrom.

12. A process as defined in claim 11 which also includes
(iii) providing a plurality of layers of said impregnated reinforcement, alone, or in combination with layers of one or more other impregnated reinforcements and
(iv) consolidating the plurality of layers under heat and pressure into a laminate.

13. A process as defined in claim 11 wherein said polyimide is a polyetherimide of the formula

15. A process as defined in claim 11 wherein the reinforcement is a glass tape or fabric.

16. A process as defined in claim 11 wherein the reinforcement is a graphite tape or fabric.

17. A process as defined in claim 11 wherein the reinforcement is a high temperature resistant organic tape or fabric.

18. A process for the preparation of a polyimide resin-fibrous reinforced composite comprising the steps of
(i) impregnating a graphite fibrous reinforcement with a solution in an organic solvent of a thermoplastic polyetherimide comprising repeating units of the formula

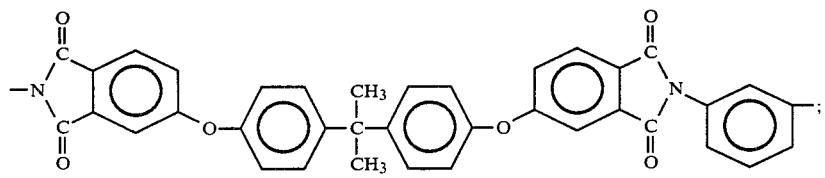

(ii) removing the organic solvent from said impregnated reinforcement, said organic solvent comprising in admixture a first solvent component (a) selected from the group consisting of chloromethane, dichloromethane, trichloromethane, dichloroethane, trichloroethane, methoxy benzene and admixtures of any of the foregoing; and a second co-solvent component (b), different from, but compatible with and of lower volatility than said first solvent component (a), and selected from the group consisting of dichloromethane, trichloromethane, dichloroethene, trichloroethene, methoxybenzene, tetrachloromethane, trichloroethylene chlorobenzene, butyrolactone and mixtures of any of the foregoing, said co-solvent (b) possessing the characteristic of reducing the evaporation rate of (a), the amount of (b) in the admixture of (b) and (a) ranging from 5 parts to 85 parts by weight per 100 parts by weight of (a) and (b) combined.

19. A process as defined in claim 18 which also includes
(iii) providing a plurality of layers of said impregnated reinforcement, alone, or in combination with layers of one or more other impregnated reinforcements, and (iv) consolidating the plurality of layers under heat and pressure into a laminate.

20. A process as defined in claim 18 wherein the polymer backbone of the thermoplastic polyetherimide described in (i) contains from 1 to 25% by weight, based on the weight of the polymer, of repeating units derived from one or more of diamines, dianhydrides and combinations thereof, selected from the group consisting of diamines of the formula:

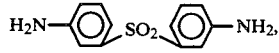

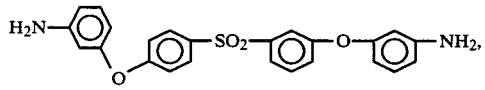

wherein R=H— or $CH_3CH_2$—,

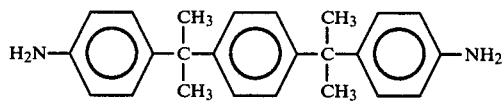

wherein X=—$CH_2$—, —O—, —$SO_2$—, or —S—, and

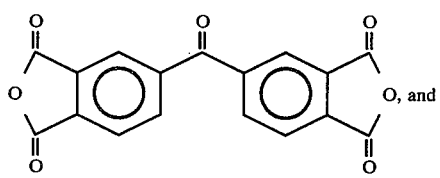

and the group consisting of dianhydrides of the formula:

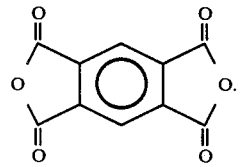

* * * * *